United States Patent [19]

Wittkamp et al.

[11] 4,118,616
[45] Oct. 3, 1978

[54] CASSETTE, PARTICULARLY A CASSETTE FOR A REEL OF WIDE RECORDING TAPE

[75] Inventors: Heinrich Wittkamp, Mannheim; Manfred Gehrung, Ludwigshafen, both of Fed. Rep. of Germany

[73] Assignee: BASF Aktiengesellschaft, Ludwigshafen, Fed. Rep. of Germany

[21] Appl. No.: 796,155

[22] Filed: May 12, 1977

[30] Foreign Application Priority Data

May 15, 1976 [DE] Fed. Rep. of Germany ....... 2621723

[51] Int. Cl.² .......................................... B65D 85/612
[52] U.S. Cl. .................... 206/387; 220/281; 220/307; 220/326
[58] Field of Search ............... 220/324, 307, 281, 326, 220/309, 282, 283; 206/387

[56] References Cited

U.S. PATENT DOCUMENTS

| 3,080,993 | 3/1963 | Livingstone | 220/307 |
| 3,358,875 | 12/1967 | Ekstrom | 220/307 |
| 3,484,016 | 12/1969 | Turner | 220/281 |
| 3,631,971 | 1/1972 | Rinkleib | 220/324 |
| 3,894,655 | 7/1975 | Mattheis et al. | 220/283 |
| 3,968,880 | 7/1976 | Ostrowsky | 220/281 |

FOREIGN PATENT DOCUMENTS 530,217 1/1955 Italy ........................................ 220/307

Primary Examiner—William Price
Assistant Examiner—Joseph M. Moy
Attorney, Agent, or Firm—Keil, Thompson & Shurtleff

[57] ABSTRACT

A cassette, particularly a cassette for a wide recording tape, consisting essentially of a lid-closable housing of plastics material, snap latch means being provided which interact between the long side of the lid and the wall of the housing opposite the lid hinge, which means consist, according to the invention, of cams on the lid and grooves in the wall of the housing, which cams and grooves engage each other to produce, when the cassette is opened, an initial closing force by deformation of the adjacent wall of the housing, in order to make opening of the cassette more difficult.

7 Claims, 6 Drawing Figures

CASSETTE, PARTICULARLY A CASSETTE FOR A REEL OF WIDE RECORDING TAPE

This invention relates to a cassette, in particular a cassette for a reel of wide recording tape, consisting of a housing in the form of an approximately rectangular hollow body having two flat broad sides forming two long walls and two parallel short sides facing each other forming two narrow walls, and a closable lid pivotally mounted between the said narrow walls, at least a portion of at least one of the long walls being elastically deformable for opening the cassette, and the edge of the lid having at least one beveled surface which associates with a beveled surface on the edge of said wall portion of the housing, and disengageable snap latch means in the form of cams and grooves on the walls and lid being provided to keep the cassette closed.

Such cassettes are generally used for the accommodation and storage of one or more objects to be readily accessible after opening the cassette.

A tape cassette for a reel of wide recording tape used in data recording is disclosed in U.S. Pat. No. 3,631,971, in which cassette the short edges of the lid are provided with scallops in the center thereof and the end walls of the housing are provided with corresponding grooves.

This cassette with its latch-catch means is not suitable for the extremely high opening and closing forces desirable in the said type of cassette for the following reasons.

The scallops and grooves, as a result of their position midway between the hinge and outer edge of the lid, are arranged only halfway along the lever arm, and are also in the region of the housing exhibiting the greatest rigidity. The scallops must therefore be relatively small and must withstand very high pressing forces, as correspondingly high opening and closing forces have to be applied. This means that manufacture of the cassette is uneconomical where a long service life is required, and that the automatic device for actuating the cassette is also costly.

The opening operation is hardly identically reproducible, since the two scallop/groove catch means can reach their extreme positions at the same time only when the arrangement is highly symmetrical, and only in such a case can the lid be simultaneously released by the two latch-catch means. The associated scallops and grooves are also very far apart for this purpose.

On account of the necessarily high opening and closing forces, the end walls of the housing are bowed out, which is a disadvantage, since the outer surfaces of these walls serve as reference surfaces for the machine.

A very similar cassette is known in which cams are provided on the long edge of the lid and the grooves are on the edge of one the long walls. Although the cams and grooves are disposed at equal distances from the narrow sides of the housing, they are arranged and designed in such a manner that the cams immediately disengage from the grooves to release the lid for opening when the wall of the housing is pressed inwardly under the action of the opening force. In this case, the cams are likely to disengage not simultaneously but consecutively, which means that the release of the lid is delayed in an indefinite manner. In the case of this type of known cassette, it is very difficult from a manufacturing point of view to comply with the demand for high opening forces and small closing forces. The arrangement of the cams as protruding elements on the wall may also lead to damage to the tape.

It is an object of the present invention to improve a cassette of the kind described above such that it is economical to manufacture, reliable in its opening and closing functions and suitable for a very wide range of applications.

This object is achieved in a cassette of the above type in that there are provided snap latch means which interact between the long side of the lid and the long wall of the housing opposite the pivotal axis of the lid, each of the cams and grooves being arranged at a distance from the narrow sides of the housing, and in that the cams and grooves at the edge of the said long wall and the cams and grooves at the edge of the long side of the lid are arranged and designed in such a manner that, when the cassette is opened by deformation of the elastically deformable portion of said long wall, a closing force is initially produced to counteract the opening force, which closing force presses the cams into the grooves to make opening of the cassette more difficult.

Due to this cassette design according to the invention, in which the cams are arranged on the long wall in the direction of the opening force, the opening and closing operations become distinct and identically reproducible snap operations, a surprising result of which is that, when the cassette is opened, the lid is flung open relatively independently of the opening force applied. As a result, the ratio of opening force to closing force can, surprisingly, be kept large.

In the present embodiment of the cassette, the cams and grooves, when engaged, have an S-shaped or sawtooth-shaped cross section. Such shapes can be simply and accurately produced.

In a further embodiment, the lid and housing of the cassette of the invention may be advantageously made of different plastics materials.

This makes it possible to provide the lid and housing with optimum properties according to the different degrees of stress they undergo during opening and closing of the cassette.

Another advantageous measure is to use two plastics materials which, when rubbed against each other, show a small difference between their static and sliding friction, in order to obtain reproducible force ratios. In a further advantageous embodiment, the wall of the housing shows greater deformability than the lid, preferably by a factor of many times. This avoids accidental and undesirable deformation of the lid.

It is also regarded as advantageous to use a lid of a polyformaldehyde plastics material and a housing of a polyester plastics material, preferably a polybutylene terephthalate. This make possible economic and trouble-free manufacture of the cassette by injection molding, a long service life of the individual parts being achieved and appreciable bowing of the narrow sides of the housing during opening and closing of the cassette being prevented.

Further details of the invention are disclosed in the following description of one embodiment of the cassette illustrated in the accompanying drawings, in which.

Figure 1:
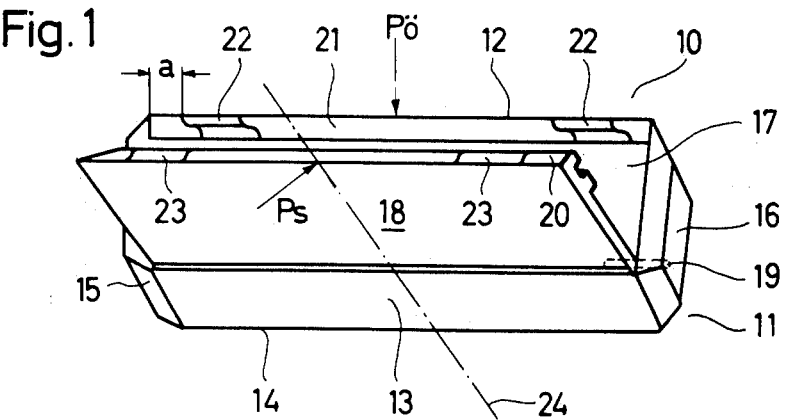
FIG. 1 is a perspective view of a cassette according to the present invention.
Figure 2:
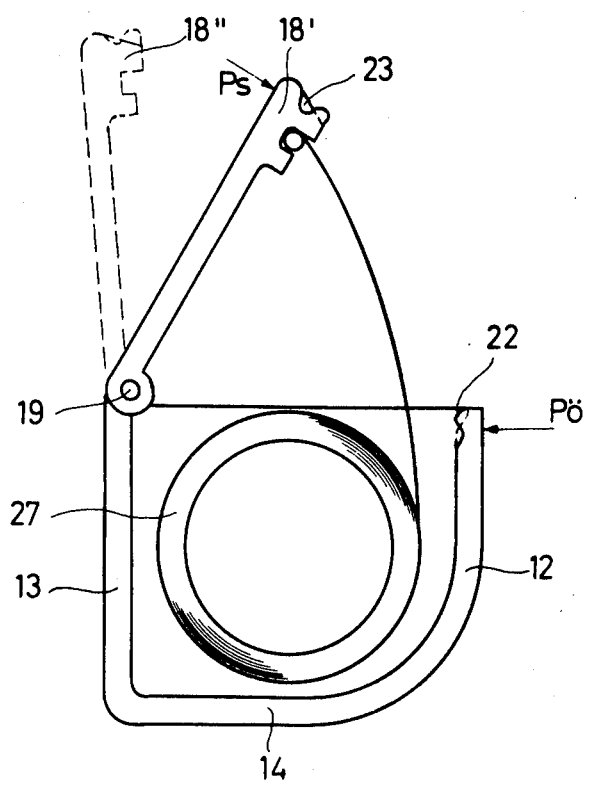
FIG. 2 is a side view of the cassette shown in FIG. 1.
Figure 3:
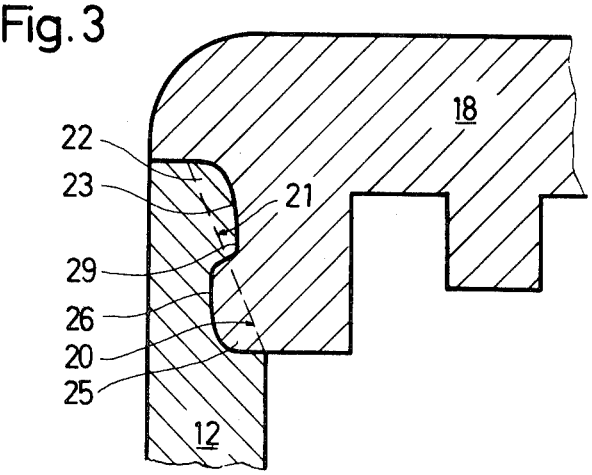
FIG. 3 is a cross-section of part of the closed cassette shown in FIG. 1 on an enlarged scale.

FIG. 1 shows the cassette 10 when open. The housing 11 is approximately rectangular and has side walls 12 to 16. Of these, walls 12 and 13 form the broad sides and walls 15 and 16 the narrow sides of the rectangular block and wall 14 forms the base thereof. The open side 17 of the housing is at the top and can be closed by means of flat lid 18 which is pivotally mounted between the narrow walls 15 and 16 by means of hinge pins 19. The free forward edge 20 of the lid 18 is beveled and cooperates with a correspondingly beveled edge 21 on the front wall 12, particularly during opening. The snap latch means are formed by cams 22 on the inwardly projecting edge 21 of wall 12, and grooves 23 on the edge 20 of the lid 18. The exact shape of the cams 22 and grooves 23 is shown in FIGS. 2 and 3. The cams 22 and grooves 23 are each arranged at a distance $a$ from the nearest end of the lid 18 and the nearest narrow wall of the housing 11 respectively, i.e. symmetrically with respect to the center line 24 of the lid 18. It is possible, however, to provide the cams and grooves on a cassette in an unsymmetrical arrangement. This may be the case when differently shaped cams and grooves are used on one and the same cassette.

In the cassette illustrated all the cams are of the same shape and all the grooves are of the same shape, as a result of which both the cam/groove catches 22′ and 22″ open simultaneously when an opening force Po is exerted at the middle of the front long wall, as is described in detail below.

FIG. 2 shows a cassette 10 containing a reel of magnetic tape 27, of which the free end is attached to the lid 18 in such a manner that the wide magnetic tape is partially unwound from the reel 27 when the lid is opened, thus making the said tape accessible to devices (not shown) for reproduction of the recording thereon. The lid is in a position 18′ between its closed position and its wide-open position 18″ indicated by dashed lines. The various parts of the cassette 10 have the same reference numerals as in FIG. 1. FIG. 3 shows a cross section of a portion of the cassette with the lid 18 in the closed position, i.e. a cross section of the parts which engage each other when the cassette 10 is closed. The cam 22 on the edge 21 (the arrows point to the respective surfaces of the edges 21 and 20) engages the groove 23 on the lid edge 20. FIG. 3 clearly shows that each of the catches consists of a cam 22 and a groove 23 as well as a lower cam 25 (on lid edge 20) and a lower groove 26 (on wall edge 21) so as to give an S-shaped line 29; this line may also have another shape, for example a sawtooth shape.

Figure 4:
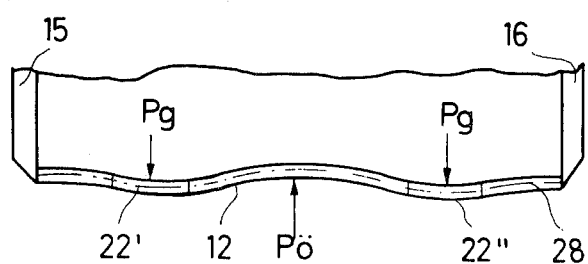
FIG. 4 is a diagrammatic illustration of the housing wall at the commencement of opening.

At all events, the invention aims at achieving the conditions illustrated diagrammatically in FIG. 4 at at least one point in time during opening of the cassette 10. Despite the exertion of the opening force Po in the direction of opening (indicated by the arrow), counteracting forces Pg must be produced at the places where catch means 22′ and 22″ engage, to prevent or delay immediate opening. It will be appreciated that these forces must occur as symmetrically as possible with respect to the force Po to obtain highly symmetrical opening operations. The deformation of the wall 12 effected by opening force Po should not, therefore, be such as to cause simple movement of the wall edge 21 away from the lid edge 20 and hence immediate disengagement of the cams 22 and 25 from the grooves 23 and 26 respectively. This would be the case if only simple, for example circular or parabolic, bowing of the wall edge 21 were produced between the narrow walls 15 and 16 of the housing 11. FIG. 4 illustrating the present case shows a line of flexure 28 which is wave-shaped or sinusoidal and is completely different from a simple curved line of flexure.

Figure 5A:
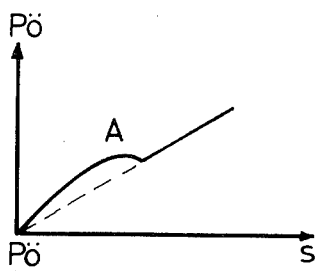
FIGS. 5a and 5b are schematic graphs of the opening force versus the width of the opening gap according to the prior art (5a) and the present invention (5b).
Figure 5B:
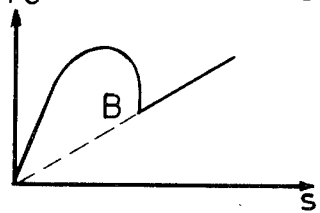

In the present embodiment, the catch means formed by the cams and grooves are in an unstable state of equilibrium at the point in time illustrated in FIG. 4 but are in stable states of equilibrium before and after that point in time, as a result of which a defined snap opening of the lid takes place. Until the cams disengage from the grooves, energy is stored in the housing wall 12 along the wavy line of flexure 28 (FIG. 4), which energy is released almost completely when disengagement takes place, i.e. when the lid 18 is opened, with the result that the lid is sharply flung wide open (position 18″). FIGS. 5a and 5b compare the force/distance graphs relating to the prior art cassette according to U.S. Pat. No. 3,631,971 and the cassette according to the present invention. The distance $s$ is the distance through which the housing bows inwardly in the direction of the opening force Po. The graph relating to the prior art cassette clearly shows that the opening force serves almost exclusively to effect bowing of the wall (curve A), whilst it is readily apparent from FIG. 5b that a considerable amount of energy is stored in the housing wall in the cassette of invention (curve B).

In a further comparison of the prior art cassette with the cassette of the present invention, the following amounts of energy were measured with a spring balance on snap opening of the lid using identical opening and closing forces Po and Ps respectively:

In the case of the cassette according to U.S. Pat. No. 3,631,971, an energy (force × distance) of $E_1 = 7$ cm×p (ponds) was obtained for a force Po of 2,000 p. By contrast, in the case of the cassette of the invention a minimum energy $E_2 = 23$ cm×p (ponds) was measured for the same opening force Po, i.e. an energy more than 3 times higher than that measured in the case of the prior art cassette. This surprising test result demonstrates the special advantage offered by the cassette of the invention. Such high-energy snap opening of the lid makes such a cassette highly useful for many other articles of everyday use, for example for tobacco tins, powder compacts and other containers.

The cassette described may be economically produced with large cam and groove dimensions and generous manufacturing tolerances.

The materials of which the parts of the cassette are made should satisfy the following requirements not only to make possible economic production but also to obtain a long service life of the cassette while maintaining a high degree of reliability during the opening and closing operations.

The materials for the lid and housing should show high abrasion resistance and a small difference between their static and sliding friction and preferably a low coefficient of sliding friction when the lid and housing materials are rubbed against each other, and also exhibit the following properties: good dimensional stability under the temperature conditions to be expected; no undue swelling or difference in swelling under the influence of moisture; and good processability by injection molding while exhibiting adequate accuracy of shape in mass production.

Furthermore, to ensure that the wall of the housing has the necessary elastic deformability, the material used for the housing should have good resistance to repeated flexing, a not unduly high modulus of elasticity and good impact resistance. These properties are exhibited, for example, by the plastics material Ultradur 4000 (Ultradur is a registered trademark of BASF Aktiengesellschaft, 6700 Ludwigshafen, Germany), a polybutylene terephthalate.

At all events, the material used for the housing should have an elastic deformability which is greater than that of the material used for the lid, preferably by a factor of many times. Apart from the material properties mentioned above for both parts of the cassette, the material used for the lid should have a not unduly low resistance to repeated flexing and a not unduly low modulus of elasticity. A suitable material for the lid is, for example, the plastics material Ultraform (Ultraform is also a registered trademark of BASF Aktiengesellschaft), a polyformaldehyde.

Although the above combination of materials is highly advantageous for the cassette of the invention, those skilled in the art will be able to find other suitable combinations of materials on the basis of the above requirements. The plastics materials may be used with or without a small addition of glass fibers.

We claim:

1. A cassette, in particular a cassette for a wide recording tape, consisting of a housing in the form of an approximately rectangular hollow body having two flat broad sides forming two long walls and two parallel short sides facing each other forming two narrow walls, and a closable lid pivotally mounted between the said narrow walls, at least a portion of at least one of the long walls being elastically deformable for opening the cassette, and the edge of the lid having at least one beveled surface which associates with a beveled surface on the edge of said wall portion of the housing, and disengageable snap latch means in the form of cams and grooves on the walls and lid being provided to keep the cassette closed, wherein the housing and the lid are made of different plastic materials and wherein the snap latch means interact between the long side of the lid and the long wall of the housing opposite the pivotal axis of the lid, each of the cams and grooves being arranged at a distance from the narrow sides of the housing, and the cams and grooves at the edge of the said long wall and the cams and grooves at the edge of the long side of the lid, when engaged having an S-shaped or sawtooth-shaped cross section, so that, when the cassette is opened by deformation of the elastically deformable portion of said long wall, a closing force is initially produced to counteract the opening force, which closing force presses the cams into the grooves to make opening of the cassette more difficult.

2. A cassette comprising a housing in the form of an approximately rectangular hollow body having two flat broad sides forming two long walls and two parallel short sides facing each other to form two narrow walls, and a closable lid of generally planar shape which is pivotally mounted between said narrow walls, at least a portion of at least one of the long walls being elastically deformable for opening the cassette, the free edge of the lid having at least one beveled surface which cooperates with a beveled surface on the free edge of said wall portion of the housing, and there being provided disengageable snap-latch means,
 in the form of sets of interacting cams and grooves,
 at the edge of the long side of the lid and at the edge of the long wall of the housing opposite the pivotal axis of the lid, which tend to keep the cassette closed, each of said sets of cams and grooves being disposed at a distance from the narrow sides of the housing, and the sets of cams and grooves at the edge of said long wall and the sets of grooves and cams at the edge of the long side of the lid having a generally wave-shaped cross section so that, when the cassette is opened by deformation of the elastically deformable portion of said long wall, a closing force is initially produced to counteract the opening force due to the cooperation of said beveled edge-surfaces, which closing force presses the cams into the grooves to make opening of the cassette more difficult.

3. A cassette as claimed in claim 2, wherein the housing and lid are made of different plastics materials.

4. A cassette as claimed in claim 2, wherein the elastic deformability of the housing wall is greater than that of the lid.

5. A cassette as claimed in claim 3, wherein the two plastics materials, when rubbed against each other, show a small difference between their static and sliding friction.

6. A cassette as claimed in claim 3, wherein the lid is made of a polyformaldehyde plastics material and the housing is made of a polyester plastics material.

7. A cassette as claimed in claim 3, wherein the lid is made of a polyformaldehyde plastics material and the housing is made of a polybutylene terephthalate plastics material.

* * * * *